(12) United States Patent
McCullough (10) Patent No.: US 10,257,294 B2
(45) Date of Patent: *Apr. 9, 2019

(54) DATA PROCESSING SYSTEM PROGRAM PRODUCT AND METHOD FOR COMMUNICATING INFORMATION RELATED TO USER ACTIVITIES ON ELECTRONIC SITES

(71) Applicant: Open Text SA ULC, Halifax (CA)

(72) Inventor: Sean M. McCullough, San Francisco, CA (US)

(73) Assignee: Open Text SA ULC, Halifax (CA)

( * ) Notice: Subject to any disclaimer, the term of this patent is extended or adjusted under 35 U.S.C. 154(b) by 19 days.

This patent is subject to a terminal disclaimer.

(21) Appl. No.: 14/868,068

(22) Filed: Sep. 28, 2015

(65) Prior Publication Data
US 2016/0021203 A1    Jan. 21, 2016

Related U.S. Application Data

(63) Continuation of application No. 12/902,735, filed on Oct. 12, 2010, now Pat. No. 9,172,761, which is a continuation of application No. 11/137,723, filed on May 25, 2005, now Pat. No. 7,831,706, which is a continuation of application No. 09/752,184, filed on Dec. 29, 2000, now Pat. No. 6,996,612.

(60) Provisional application No. 60/173,831, filed on Dec. 30, 1999.

(51) Int. Cl.
*G06F 13/00* (2006.01)
*H04L 29/08* (2006.01)

(52) U.S. Cl.
CPC .............. *H04L 67/22* (2013.01); *H04L 67/36* (2013.01)

(58) Field of Classification Search
CPC ................................ H04L 67/22; H04L 67/36
USPC ................................ 709/224, 223, 225, 229
See application file for complete search history.

(56) References Cited

U.S. PATENT DOCUMENTS

| | | |
|---|---|---|
| 4,754,428 A | 6/1988 | Schultz et al. |
| 4,811,207 A | 3/1989 | Hikita et al. |
| 5,210,824 A | 5/1993 | Putz et al. |
| 5,212,787 A | 5/1993 | Baker et al. |
| 5,226,161 A | 7/1993 | Khoyi et al. |

(Continued)

OTHER PUBLICATIONS thirdvoice.com—Home Page and Frequently Asked Questions (7 pages), www.thirdvoice.com, www.thirdvoice.com/help.20/faq.htm, 2000.

(Continued)

*Primary Examiner* — Kenneth R Coulter
(74) *Attorney, Agent, or Firm* — Sprinkle IP Law Group (57) ABSTRACT

Information related to activity of a user may be provided using a method or a data processing system program product to perform the method. In one embodiment, the method includes sending a first view request to a first electronic site, receiving a first view from the first electronic site, and first information related to the first view request to a second entity that is different from the first entity. In another embodiment, a data processing system program product may perform a method of sending information related to a view request from the user for an electronic site. The information is to be sent to an entity that is different from an entity that substantially controls or owns the electronic site and different from an Internet service provider of the user, if the user is to use the Internet service provider in accessing the electronic site.

17 Claims, 3 Drawing Sheets

(56) References Cited

U.S. PATENT DOCUMENTS

| | | |
|---|---|---|
| 5,257,369 A | 10/1993 | Skeen et al. |
| 5,312,787 A | 5/1994 | Uchida et al. |
| 5,331,673 A | 7/1994 | Elko et al. |
| 5,339,392 A | 8/1994 | Risberg et al. |
| 5,421,015 A | 5/1995 | Khoyi et al. |
| 5,557,717 A | 9/1996 | Wayner |
| 5,572,643 A | 11/1996 | Judson |
| 5,704,017 A | 12/1997 | Heckerman et al. |
| 5,727,129 A | 3/1998 | Barrett et al. |
| 5,732,218 A | 3/1998 | Bland et al. |
| 5,740,430 A | 4/1998 | Rosenberg et al. |
| 5,761,416 A | 6/1998 | Mandal et al. |
| 5,774,660 A | 6/1998 | Brendel et al. |
| 5,790,426 A | 8/1998 | Robinson |
| 5,790,790 A | 8/1998 | Smith et al. |
| 5,796,952 A | 8/1998 | Davis et al. |
| 5,870,559 A | 2/1999 | Leshem et al. |
| 5,878,223 A | 3/1999 | Becker et al. |
| 5,884,282 A | 3/1999 | Robinson |
| 5,918,014 A | 6/1999 | Robinson |
| 5,958,008 A | 9/1999 | Pogrebisky et al. |
| 5,960,411 A | 9/1999 | Hartman et al. |
| 5,999,908 A | 12/1999 | Abelow |
| 6,041,311 A | 3/2000 | Chislenko et al. |
| 6,041,335 A | 3/2000 | Merritt et al. |
| 6,049,777 A | 4/2000 | Sheena et al. |
| 6,067,565 A | 5/2000 | Horvitz |
| 6,012,052 A | 6/2000 | Altschuler et al. |
| 6,073,241 A | 6/2000 | Rosenburg |
| 6,085,226 A | 7/2000 | Horvitz |
| 6,092,049 A | 7/2000 | Chislenko et al. |
| 6,094,662 A | 7/2000 | Hawes |
| 6,112,186 A | 8/2000 | Bergh et al. |
| 6,112,240 A | 8/2000 | Pogue |
| 6,112,279 A | 8/2000 | Wang |
| 6,119,103 A | 9/2000 | Basch et al. |
| 6,128,665 A | 10/2000 | Fields et al. |
| 6,138,141 A | 10/2000 | DeSimone et al. |
| 6,138,155 A | 10/2000 | Davis et al. |
| 6,141,737 A | 10/2000 | Krantz et al. |
| 6,144,962 A | 11/2000 | Weinberg et al. |
| 6,185,586 B1 | 2/2001 | Judson |
| 6,185,608 B1 | 2/2001 | Hon et al. |
| 6,185,614 B1 | 2/2001 | Cuomo et al. |
| 6,199,099 B1 | 3/2001 | Gershman et al. |
| 6,205,472 B1 | 3/2001 | Gilmour |
| 6,285,987 B1 | 9/2001 | Roth et al. |
| 6,304,904 B1 | 10/2001 | Sathyanarayan et al. |
| 6,308,203 B1 | 10/2001 | Itabashi et al. |
| 6,321,206 B1 | 11/2001 | Honarvar |
| 6,321,256 B1 | 11/2001 | Himmel et al. |
| 6,393,479 B1 | 5/2002 | Glommen |
| 6,430,539 B1 | 8/2002 | Lazarus et al. |
| 6,446,261 B1 | 9/2002 | Rosser |
| 6,449,604 B1 | 9/2002 | Hansen et al. |
| 6,456,305 B1 | 9/2002 | Qureshi et al. |
| 6,460,079 B1 | 10/2002 | Blumenau |
| 6,559,882 B1 | 5/2003 | Kerchner |
| 6,581,072 B1 | 6/2003 | Mathur et al. |
| 6,606,657 B1 | 8/2003 | Zilberstein et al. |
| 6,629,136 B1 | 9/2003 | Naidoo |
| 6,640,215 B1 | 10/2003 | Galperin et al. |
| 6,643,696 B2 | 11/2003 | Davis et al. |
| 6,654,804 B1 | 11/2003 | Fleming, III |
| 6,701,363 B1 | 3/2004 | Chiu et al. |
| 6,732,331 B1 | 5/2004 | Alexander |
| 6,745,367 B1 | 6/2004 | Bates |
| 6,757,740 B1 | 6/2004 | Parekh et al. |
| 6,771,290 B1 | 8/2004 | Hoyle |
| 6,836,799 B1 | 12/2004 | Philyaw et al. |
| 6,839,682 B1 | 1/2005 | Blume et al. |
| 6,996,612 B1 | 2/2006 | McCullough |
| 7,155,506 B1 | 12/2006 | McCullough |
| 7,502,994 B2 | 3/2009 | Kocol |
| 7,831,706 B1 | 11/2010 | McCullough |
| 7,966,259 B1 | 6/2011 | Bui |
| 8,612,891 B2 | 12/2013 | Singh et al. |
| 9,172,761 B2 | 10/2015 | McCullough |
| 2001/0037321 A1 | 11/2001 | Fishman et al. |
| 2002/0026519 A1 | 2/2002 | Itabashi et al. |
| 2002/0099815 A1 | 7/2002 | Davis et al. |
| 2003/0188263 A1 | 10/2003 | Bates |
| 2006/0123105 A1 | 6/2006 | Parekh et al. |
| 2009/0063656 A1 | 3/2009 | Blumenau et al. |
| 2009/0172159 A1 | 7/2009 | Kocol |
| 2011/0029663 A1 | 2/2011 | McCullough |

OTHER PUBLICATIONS

Kitts, "An Evaluation of Customer Retention and Revenue Forecasting in the Retail Sector: Investigation into the effects of Seasonality, Spending an Method" by DataSage, Inc., Oct. 25, 1999. 63 pages.

Kitts, "RMS Revenue and Retention Forecasting Final Phase Model Specification" by DataSage, Inc., Jan. 31, 2000, 16 pages.

Discount Store News, "Datasage Customer Analyst," 1998.

Montgomery, et al., "Estimating Price Elasticities with Theory-Based Priors," J. Marketing Research, vol. 36, pp. 413-423, 1999.

Simon, "Price Management," Elsevier Sci Pub, pp. 13-41, 1989.

Subrahmanyan and Shoemaker, "Developing Optimal Pricing and Inventory Policies for Retailers Who Face Uncertain Demand," J. Retailing, vol. 72, pp. 7-30, 1996.

Vilcassim and Chintagunta, "Investigating Retailer Product Category Pricing from Household Scanner Panel Data," J. Retailing, vol. 71, pp. 103-128, 1995.

Weinstein, "Tackling Technology," Progressive Grocer, 1999.

Wellman, "Down in the (Data) Mines," Supermarket Business, pp. 33-35, 1999.

RT News, "New Customer Management System Returns Lost Sales to Dick's," RT Magazine, 1999.

DataSage, Inc., "DataSage Customer Analyst," Progressive Grocer, 1998.

Miller, M., "Applications Integration—Getting It Together," PC Magazine, Feb. 8, 1994, pp. 111-112, 116-120, 136, 138.

PointCast 2.0 Eases Burden on Network, 3 pp., Jun. 2, 1997.

Strom, David, The Best of Push, 7 pp., Apr. 1997.

When Shove Comes to Push, 7 pp., Feb. 10, 1997.

Office Action issued in U.S. Appl. No. 09/752,184, dated Mar. 26, 2004.

Office Action issued in U.S. Appl. No. 09/752,184, dated Oct. 8, 2004.

Cabena, Peter et al., Intelligent Miner for Data Applications Guide, IBM RedBook SG24-5252-00, Mar. 1999.

Datasage.com News and Events—DataSage Releases netCustomer, the 1st Individualization Solution for E-Commerce, retrieved Feb. 16, 2005 from Archive.org , Aug. 2, 1999, 3 pgs.

Datasage.com—Executive Overview—Retail, Retail Data Mining Executive Overview, retrieved Feb. 16, 2005 from Archive.org, Dec. 1998, 7 pgs.

Gallant, Steve et al., Successful Customer Relationship Management in Financial Applications (Tutorial PM-1), Conference on Knowledge Discovery in Data, ISBN:1-58113-305-7, 2000, pp. 165-241.

Vignette Corporation to Acquire DataSage, Inc., retrieved from Archive.org Feb. 16, 2005, Jan. 10, 2000, 3 pgs.

Chapman, Pete et al., CRISP-DM 1.0—Step-by-step data mining guide, retrieved from www.crisp-dm.org Feb. 17, 2005, 2000, pp. 1-78.

Office Action issued in U.S. Appl. No. 11/137,723, dated Oct. 3, 2006.

Office Action issued in U.S. Appl. No. 11/137,723, dated Feb. 6, 2008.

Office Action issued in U.S. Appl. No. 11/137,723, dated Aug. 20, 2008.

Office Action issued in U.S. Appl. No. 11/137,723, dated Dec. 23, 2009.

Office Action for U.S. Appl. No. 12/902,735, dated Feb. 1, 2011, 13 pgs.

(56) References Cited

OTHER PUBLICATIONS

Office Action for U.S. Appl. No. 12/902,735, dated Jul. 20, 2011, 12 pgs.
Office Action for U.S. Appl. No. 12/902,735, dated May 28, 2013, 10 pgs.
Office Action for U.S. Appl. No. 12/902,735, dated Dec. 17, 2013, 10 pgs.
Office Action for U.S. Appl. No. 12/902,735, dated May 21, 2014, 7 pgs.
Office Action for U.S. Appl. No. 12/902,735, dated Dec. 17, 2014, 4 pgs.
Notice of Allowance for U.S. Appl. No. 12/902,735, dated Jun. 12, 2014, 7 pgs.

DATA PROCESSING SYSTEM PROGRAM PRODUCT AND METHOD FOR COMMUNICATING INFORMATION RELATED TO USER ACTIVITIES ON ELECTRONIC SITES

RELATED APPLICATIONS

This application is a continuation of, and claims a benefit of priority under 35 U.S.C. 120 of the filing date of U.S. patent application Ser. No. 12/902,735, filed Oct. 12, 2010, now U.S. Pat. No. 9,172,761, entitled "METHOD OF GATHERING INFORMATION RELATED TO ACTIVITY OF A USER AND A DATA PROCESSING SYSTEM PROGRAM PRODUCT," which is a continuation of, and claims a benefit of priority from U.S. patent application Ser. No. 11/137,723, filed May 25, 2005, issued as U.S. Pat. No. 7,831,706, entitled "METHOD OF GATHERING INFORMATION RELATED TO ACTIVITY OF A USER AND A DATA PROCESSING SYSTEM PROGRAM PRODUCT," which is a continuation of, and claims a benefit of priority from U.S. patent application Ser. No. 09/752,184, filed Dec. 29, 2000, issued as U.S. Pat. No. 6,996,612, entitled "METHOD OF PROVIDING INFORMATION RELATED TO ACTIVITY OF A USER AND A DATA PROCESSING SYSTEM PROGRAM PRODUCT," which in turn claims priority under 35 U.S.C. § 119(e) to U.S. Patent Application No. 60/173,831, filed Dec. 30, 1999, entitled "METHOD FOR CONTROLLING WEB USAGE PATTERNS VIA THIRD-PARTY ANNOTATION SERVICES," all of which are incorporated by reference herein for all purposes.

FIELD OF THE INVENTION

This invention relates in general to methods and data processing system program products, and more particularly, to methods and data processing system program products related to activity of a user at one or more electronic sites.

RELATED ART

Figure 1:
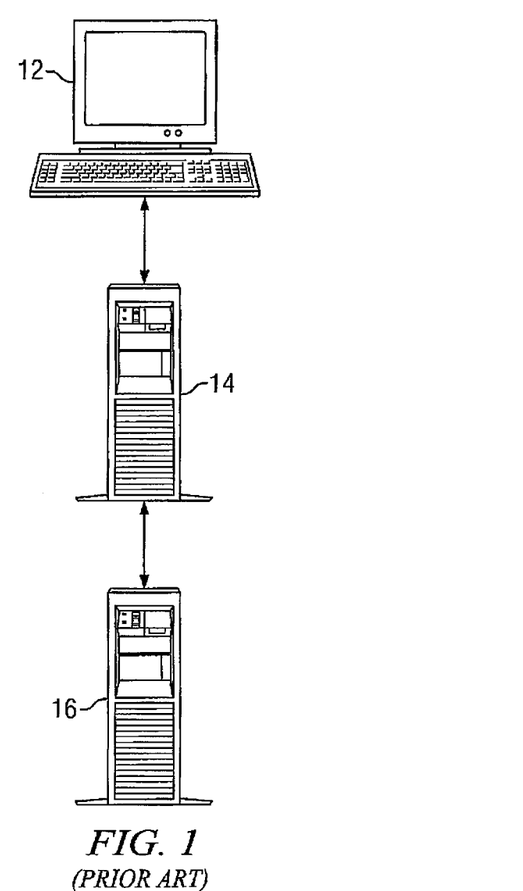
FIG. 1 includes an illustration of relationships between a user, ESAP, and electronic site when accessing information from the electronic site (prior art)

The Internet allows the access of information by a wide variety of users. FIG. 1 includes an illustration of a system for a user 12 to access an electronic site 16 via an electronic site access provider (ESAP) 14. Each of the user 12 and electronic site 16 are bi-directionally coupled to the ESAP 14. Many times, the electronic site 16 can be an Internet site, and the ESAP 14 can be an Internet service provider. Typically, the user 12 makes a request for a view (e.g., a page) to the electronic site 16 via the ESAP 14. The protocol for the request is usually in hypertext transfer protocol (HTTP).

One of the challenges of the Internet has been for an entities that substantially control or own the electronic sites, such as electronic site 16, to obtain reliable information about users including user 12. While the entities may have information regarding activities of the users at their respective electronic sites, this information is typically sparse and gives only a small part of the profiles of the users.

Another attempt to get more information about users is for the entities that substantially control or own the electronic sites to form an alliance with one another to collect and share information about users at their respective electronic sites. Typically, the alliances cover a relatively small fraction of all electronic sites. To the extent users are accessing electronic sites outside the alliance, the members of the alliance do not have access to that information. Therefore, the profiles of the users include just a small portion of information regarding activities of the users.

ESAP 14 typically collects information regarding activities of its users with respect to electronic sites. However, the ESAP 14 may use the information for limited purposes, such as determining if the ESAP 14 needs additional servers, activity of one user is significantly more than all other users, and the like. Due to privacy concerns or policy considerations of the ESAP 14, it typically does not share all information that it collects regarding its subscribers' (users') activities with the entities that substantially control or own the electronic sites for the specific purpose of creating profiles of the ESAP's subscribers.

SUMMARY OF THE INVENTION

Information related to activity of a user may be provided using a method or a data processing system program product. The data processing system program product has a code embodied within a data processing system readable medium, and the code includes a set of instructions executable by a data processing system to perform the method. In one embodiment, the method includes an act of sending a first view request to a first electronic site. The electronic site is typically substantially controlled or owned by a first entity. The method further includes receiving a first view from the first electronic site. The first view substantially corresponds to the first view request. The method also includes sending first information related to the first view request to a second entity that is different from the first entity. In a specific implementation of the embodiment, the acts of sending the first view request, receiving, and sending the first information are performed by the user.

In another embodiment, a data processing system program product has a code embodied within a data processing system readable medium. The code comprises instructions executable by a data processing system of a user to perform a method of sending information related to a view request from the user for an electronic site. The information is to be sent to an entity that is different from an entity that substantially controls or owns the electronic site and is different from an Internet service provider or electronic site access provider of the user, if the user is to use such provider in accessing the electronic site.

BRIEF DESCRIPTION OF THE DRAWINGS

The present invention is illustrated by way of example and not limitation in the accompanying figures, in which like references indicate same elements, and in which.

Skilled artisans appreciate that elements in the figures are illustrated for simplicity and clarity and have not necessarily been drawn to scale. For example, the dimensions of some of the elements in the figure may be exaggerated relative to other elements to help to improve understanding of embodiments of the present invention.

DETAILED DESCRIPTION

Embodiments of the present invention allow information to be gathered regarding a user, where the information is more accurate than data collected at an individual electronic site or by an alliance of different entities having their own electronic sites because information regarding the user's activities outside individual electronic site and the alliance is collected. In one embodiment, the user sends a view request to an electronic site and also sends information related to the view request to a user information system that includes a data base of the user's activities at electronic sites. In one embodiment, the user may be able to enable or disable the information collection. The present invention is defined in the appended claims and is better understood after reading the descriptions of the embodiments that follow.

Before describing the embodiments in more detail, some terms are defined or clarified to improve understanding. "Electronic site" includes any site where information is sent to and received from an electronic communication device, such as a computer, mobile phone, personal digital assistant, or the like. A web site is an example of a common type of electronic site. "Entity" is any individual, partnership, company, corporation, or organization.

Figure 2:
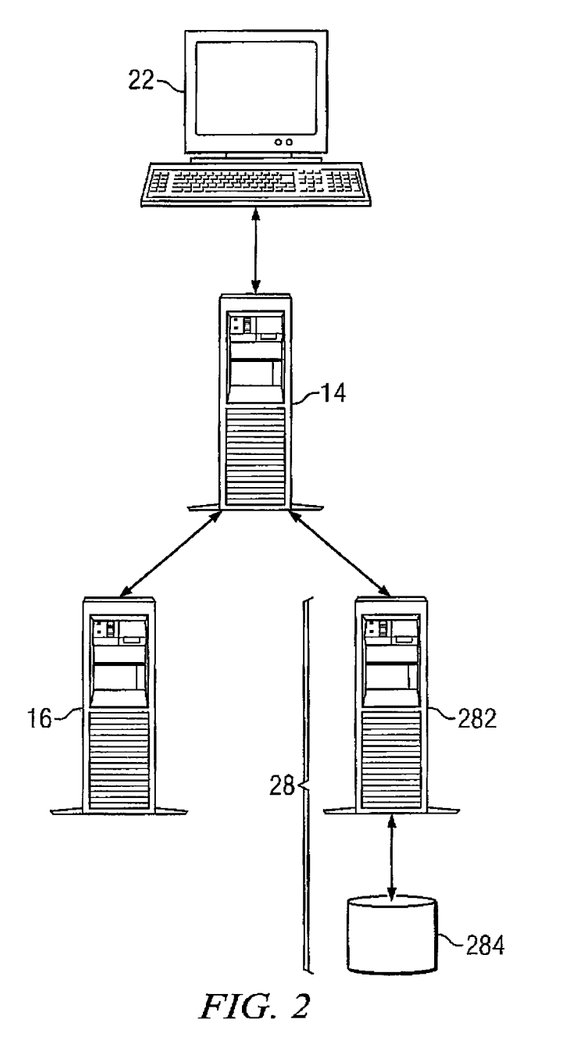
FIG. 2 includes an illustration of a system that allows information from a user to be recorded as he or she makes view requests from an electronic site via an ESAP.

FIG. 2 includes an illustration of a system that allows information from a user to be recorded in accordance with an embodiment of the present invention. Each of the user 22 and electronic site 16 are bi-directionally coupled to the ESAP 14. Although the user 22 is illustrated as being a personal computer, the user 22 is typically an individual who may potentially purchase a product or service from at the electronic site 16. The user 22 can access electronic sites using the personal computer, a personal digital assistant, a mobile phone, or the like. All of these devices typically include a data processing system (computer, microprocessor, microcontroller, or the like). The ESAP 14 and electronic site 16 are illustrated as servers, which are another type of data processing system. In this particular embodiment, the user 22, ESAP 14, and electronic site 16 are connected via the Internet. Although not shown, additional servers, switches, routers, combinations thereof, or the like may lie between the ESAP 14 and the electronic site 16 but are not shown in FIG. 2.

The ESAP 14 is also bi-directionally coupled to a user information system 28 that includes a server 282 and a database 284, which is that is bi-directionally coupled to the server 282. The database 284 may be part of or separate from the server 282. In still other embodiments, the database 284 may be coupled to the ESAP 14 without an intervening data processing system. The balance of the description of the embodiments are described with respect to the server/database configuration as shown in FIG. 2. In FIG. 2, the different entities are illustrated by some of the equipment that may be used by that entity.

Unlike the data processing system for user 12, the data processing system of user 22 includes a data processing system program product that allows the user 22 to have his or her activities with respect to electronic sites recorded, as will be explained in more detail later. The data processing system program product of user 22 typically includes code embodied within a data processing system readable medium. The code includes instructions executable by a data processing system for carrying out at least one method.

In one specific implementation, the data processing system program product may be a plug-in for a browser program. Before being loaded, the plug-in may reside within a hard disk, CD-ROM, floppy diskette, or other nonvolatile memory within the data processing system of the user 22. During or after the browser program is launched, the plug-in is loaded into the random access memory or other similar volatile memory within data processing system of the user 22. Each of the memories mentioned within this paragraph includes a data processing system readable medium. The data processing system program product is not limited to a plug-in for a browser program. The data processing system program product can be part of the browser program (not a separate plug-in), a different software application, an operating system, or the like.

Many variables are possible with the code of the data processing system program product. In one embodiment, the code may include instructions where information related to view requests is always sent (cannot be disabled unless code is removed or altered). In another embodiment, the code may include instructions to allow the user 22 to determine whether the information is to be sent. The data processing system program product may have code for a user 22 to select a first mode of operation or a second mode of operation. The first mode of operation may be to enable (activate) sending the information to the user information system 28, and the second mode of operation may be to disable (deactivate) sending the information to the user information system 28. Even if the first mode of operation is activated, the user 22 is not sent a view solely in response to the information being sent to the user information system 28.

The selection of the different modes may be achieved by a pull-down menu in the browser program, buttons as part of a graphical user interface, a separate screen for reconfiguring the settings, or the like. Depending on the product, the browser program may or may not need to be relaunched for the changes to take effect. The change may be permanent until the user 22 modifies the configuration, or the code may be configured to return to the original default when the browser program is closed and later relaunched. Clearly, the product could be configured with an opposite default normally disabled). The use of the product is better understood in conjunction with the description of the method illustrated in FIG. 3.

Figure 3:
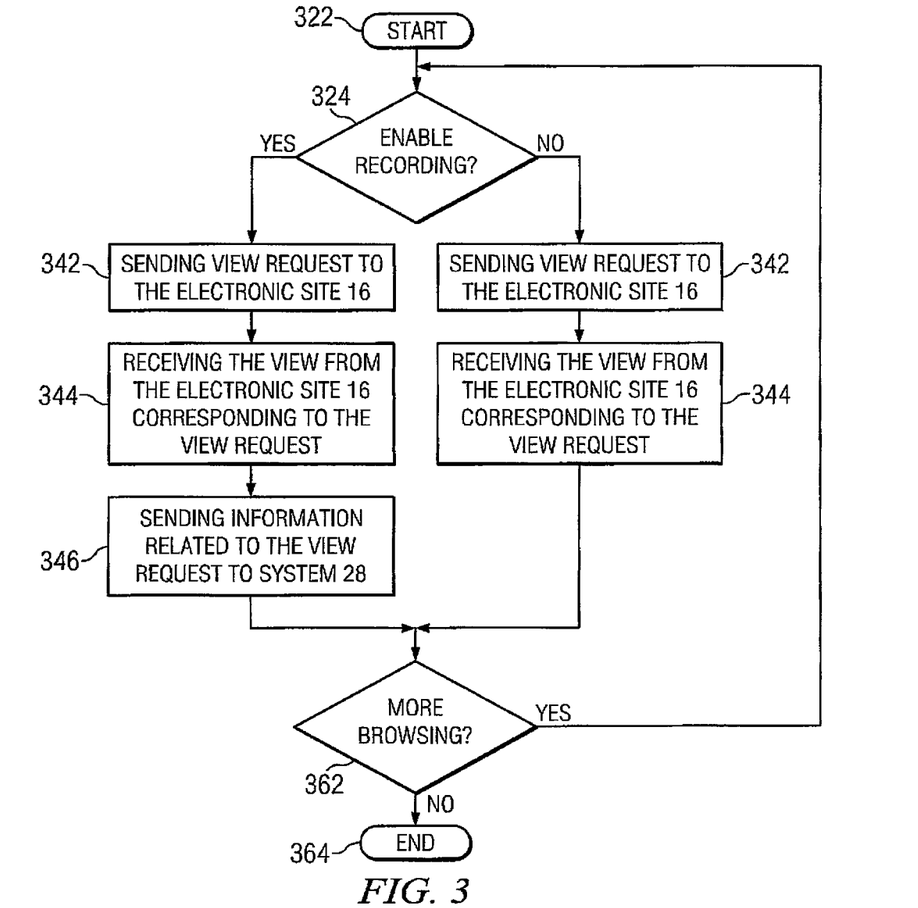
FIG. 3 includes a flow diagram for a method of using the system in FIG. 2.

FIG. 3 includes a process flow diagram for a method of using the system illustrated in FIG. 2. For this example, the data processing system program product as described in the preceding paragraph has a user selectable function. The user 22 starts (oval 322) by making a decision whether the user 22 should enable the recording function of the product (diamond 324). Regardless whether recording is enabled (the "YES" branch from diamond 324) or disable (the "NO" branch from diamond 324), the method proceeds with the acts of the user 22 sending a view request to the electronic site 16 (block 342) and receiving from the electronic site 16 a view substantially corresponding to the view request (block 344). The request is typically in the form of an HTTP request for a Universal Resource Locator (URL). Some advertising or additional information may be sent with the view; however, most of the view comes from electronic site 16 in response to the view request from the user 22. These acts are similar to those performed by users with conventional browser programs.

Unlike conventional browser programs, the product may allow recording of information related to the view request. Referring to the "YES" branch from diamond 324), the user sends information related to the view request to user information system 28 (block 346). The information can include site information related to the view request (e.g., the URL or the like), an identifier of the user 22 (e.g., Internet Protocol address, pre-assigned user identifier, a cookie, or the like), temporal information related to the view request (e.g., time stamp, time-at-view, or the like), or the like. The entity that substantially controls or owns the user information system 28 is usually different from the entities that substantially control or own the ESAP 14 or the electronic site 16. In one specific implementation, the information may be sent to the user information system 28 via the ESAP 14 as shown in FIG. 2 (the ESAP 14 forwards the information received from the user 22 to the user information system 28). The server 282 receives the information and records it within the database 284. If the optional server 282 is not used, the ESAP 14 may record information within database 284.

Returning to FIG. 3, the timing for sending of information in act 346 is variable. The information could be sent at substantially the same time as act 342 or 344, between the acts, or after the acts. To capture as much information as possible, the information may be send (block 346) every time a request for a view is made (block 342). Alternatively, information may only be collected for electronic sites that exist. In the latter instance, the database may not record error messages for views not found or displayed with respect to the user. In another embodiment, the information may be sent (block 346) before sending the view request (block 342). In yet another embodiment, information may be accumulated by the user 22 and sent to the system 28 after a predetermined volume of data has accumulated or on a periodic (e.g., daily, weekly, or the like) basis. While the data may not be as current as other embodiments, this method should reduce the work of the ISP 14 by reducing the number of transmissions of information to the system 28. Many other different timing schemes can be used.

Regardless which path is used in FIG. 3, the user 22 determines whether more browsing is desired (diamond 362). If not, the method ends (oval 364). Otherwise, the method returns to decision diamond 324. For the subsequent view request, the user may change the configuration. For example, during the first view request, the recording may have been enabled. Before a second view request, the user 22 disables recording. The acts 342 and 344 are performed, but in this instance, the user 22 does not send information related to the second view to anyone (i.e., the act listed in block 346 is not performed), and more specifically, not to user information system 28. This feature allows the user to decide whether he or she wants others to build a user profile based on any or all of his or her activities at the electronic sites. The user 22 can maintain the level of privacy that the user 22 desires.

Privacy issues and selection of the mode of operation (enable versus disable) for recording by the user 22 can depend on the identity of the various entities. Typically, the data processing system of user 22, the ESAP 14, the electronic site 16, and user information system 28 are not significantly or substantially controlled or owned by a single entity. In many instances, an entity does not significantly or substantially control or own more than one of the data processing systems of the user 22, the ESAP 14, the electronic site 16, and the user information system 28. However, the server 282 and database 284 are substantially controlled or owned by a single entity in most instances. Note that one of the entities may control or own part of a different entity, but such control or ownership is typically not significant (less than approximately 10% ownership of the different entity or less than approximately 10% ownership of the voting shares of the different entity). These various scenarios are not meant to prevent an entity from substantially controlling or owning one, two, three, or all four of the data processing systems of the user 22, the ESAP 14, the electronic site 16, and the user information system 28.

The entity that substantially controls or owns the user information system 28 may use the information collected or obtained as that entity deems appropriate. The entity may allow the user 22 to access his or her information. In one embodiment, the user 22 may send and the system 28 may receive an inquiry for at least some of the information collected on that user 22. In response to the request, the system 28 may send and the user would receive information regarding that the user 22 that substantially corresponds to the inquiry.

The system 28 may also be configured in a hierarchical manner, such that user 22, who has a higher priority, can obtain information on all or a portion of other users having a lower priority. In still other embodiments, the entity that substantially controls or owns the system 28 may provide a commercial service that sells part or all the information within database 284 to others, such as an entity that substantially controls or owns the electronic site 16. Although not shown, the electronic site 16 and the system 28 may be bi-directionally coupled to each other. The electronic 16 may access the system 28 to determine the content of advertising or other similar information that may be sent user 22. This content may be sent as part of the view or sent separately to the user 22.

The systems and methods described above allow a more accurate user profile to be achieved compared to information collected on a user only at an electronic site or only at electronic sites that are part of an alliance. The ability to enable/disable recording allows the user 22 to let most of his or her activities at electronic sites be recorded while not having all activities recorded. The user 22 may want activities not recorded where the user 22 might be harmed if knowledge of such activity would become publicly available.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of communicating information related to user activities on electronic sites, the method comprising:
   loading, by an electronic communication device, a data processing system program product into a non-transitory computer memory of the electronic communication device;
   executing, by electronic communication device, the data processing system program product on the electronic communication device;
   while the data processing system program product is executing on the electronic communication device:

sending, by the electronic communication device, a plurality of view requests from the electronic communication device over a network to a plurality of electronic sites via server machines, the server machines providing access to the plurality of electronic sites, the plurality of electronic sites substantially controlled or owned by a first plurality of entities;

receiving, by the electronic communication device that embodies the data processing system program product, a plurality of views of the plurality of electronic sites over the network via the server machines, wherein each view of the plurality of views substantially corresponds to a respective view request of the plurality of view requests; and sending, by the electronic communication device that embodies the data processing system program product, over the network via the server machines, user activity information related to the plurality of view requests to a user information system server which is different from the plurality of electronic sites and which contains a database of the user activity information, the user information system server bi-directionally coupled to the server machines that provide access to the plurality of electronic sites, the user information system server substantially controlled or owned by an entity that is different from the first plurality of entities, wherein the information related to the plurality of view requests is sent:

every time a view request of the plurality of view requests is made;

after a predetermined volume of data has accumulated on the electronic communication device; or on a periodic basis.

2. The method of claim 1, wherein the server machines are substantially controlled or owned by a second plurality of entities and wherein the entity that substantially controls or owns the user information system server is different from the second plurality of entities.

3. The method of claim 1, wherein the data processing system program product includes instructions to always send the information related to the plurality of view requests to the user information system server.

4. The method of claim 1, wherein the data processing system program product includes instructions to allow a user associated with the electronic communication device to enable or disable the sending of the information related to the plurality of view requests to the user information system server.

5. The method of claim 1, wherein the data processing system program product comprises instructions for a browser program plug-in, a browser program component, a software application, or an operating system.

6. The method of claim 1, wherein the information related to the plurality of view requests includes, for each view request of the plurality of view requests, site information related to the view request, an identifier related to a user associated with the electronic communication device, and temporal information related to the view request.

7. A data processing system program product comprising at least one non-transitory computer readable medium storing instructions translatable by at least one processor of an electronic communication device to perform:

loading the data processing system program product into a non-transitory computer memory of the electronic communication device;

executing the data processing system program product on the electronic communication device;

while the data processing system program product is executing on the electronic communication device:

sending a plurality of view requests from the electronic communication device over a network to a plurality of electronic sites via server machines, the server machines providing access to the plurality of electronic sites, the plurality of electronic sites substantially controlled or owned by a first plurality of entities;

receiving a plurality of views of the plurality of electronic sites over the network via the server machines, wherein each view of the plurality of views substantially corresponds to a respective view request of the plurality of view requests; and sending, over the network via the server machines, user activity information related to the plurality of view requests to a user information system server which is different from the plurality of electronic sites and which contains a database of the user activity information, the user information system server bi-directionally coupled to the server machines that provide access to the plurality of electronic sites, the user information system server substantially controlled or owned by an entity that is different from the first plurality of entities, wherein the information related to the plurality of view requests is sent:

every time a view request of the plurality of view requests is made;

after a predetermined volume of data has accumulated on the electronic communication device: or on a periodic basis.

8. The data processing system program product of claim 7, wherein the server machines are substantially controlled or owned by a second plurality of entities and wherein the entity that substantially controls or owns the user information system server is different from the second plurality of entities.

9. The data processing system program product of claim 7, wherein the instructions are configured for always sending the information related to the plurality of view requests to the user information system server.

10. The data processing system program product of claim 7, wherein the instructions are configured for allowing a user associated with the electronic communication device to enable or disable the sending of the information related to the plurality of view requests to the user information system server.

11. The data processing system program product of claim 7, wherein the instructions are configured for a browser program plug-in, a browser program component, a software application, or an operating system.

12. An electronic communication device, comprising:

at least one processor;

at least one non-transitory computer readable medium; and stored instructions translatable by the at least one processor to perform:

loading a data processing system program product into a non-transitory computer memory of the electronic communication device;

executing the data processing system program product on the electronic communication device;

while the data processing system program product is executing on the electronic communication device:

sending a plurality of view requests from the electronic communication device over a network to a plurality of electronic sites via server machines, the server machines providing access to the plurality of electronic sites, the plurality of electronic sites substantially controlled or owned by a first plurality of entities;

receiving a plurality of views of the plurality of electronic sites over the network via the server machines, wherein each view of the plurality of views substantially corresponds to a respective view request of the plurality of view requests; and sending, over the network via the server machines, user activity information related to the plurality of view requests to a user information system server which is different from the plurality of electronic sites and which contains a database of the user activity information, the user information system server bi-directionally coupled to the server machines that provide access to the plurality of electronic sites, the user information system server substantially controlled or owned by an entity that is different from the first plurality of entities, wherein the information related to the plurality of view requests is sent:

every time a view request of the plurality of view requests is made;

after a predetermined volume of data has accumulated on the electronic communication device; or on a periodic basis.

13. The electronic communication device of claim 12, wherein the server machines are substantially controlled or owned by a second plurality of entities and wherein the entity that substantially controls or owns the user information system server is different from the second plurality of entities.

14. The electronic communication device of claim 12, wherein the instructions are configured for always sending the information related to the plurality of view requests to the user information system server.

15. The electronic communication device of claim 12, wherein the instructions are configured for allowing a user associated with the electronic communication device to enable or disable the sending of the information related to the plurality of view requests to the user information system server.

16. The electronic communication device of claim 12, wherein the instructions are configured for a browser program plug-in, a browser program component, a software application, or an operating system.

17. The electronic communication device of claim 12, wherein the information related to the plurality of view requests includes, for each view request of the plurality of view requests, site information related to the view request, an identifier related to a user associated with the electronic communication device, and temporal information related to the view request.

* * * * *